April 21, 1936.   H. H. MOSS   2,038,439
WELDED JOINT AND METHOD OF MAKING SAME
Filed April 6, 1932
Fig. I.
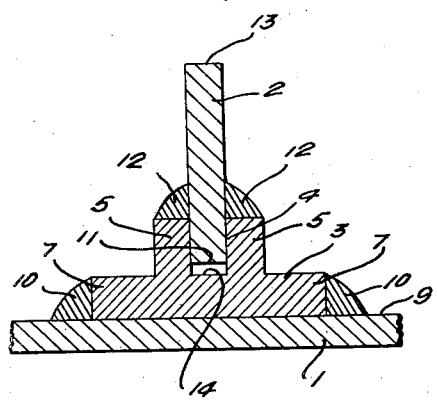
Fig. II.
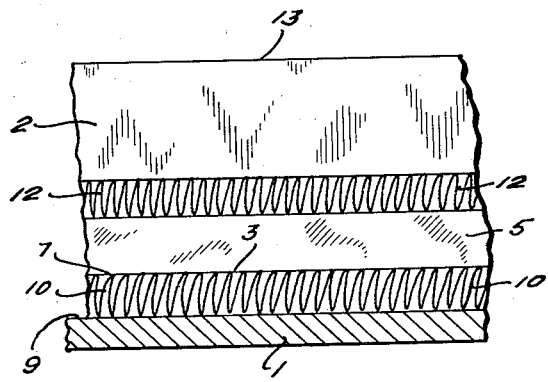
Fig. III.
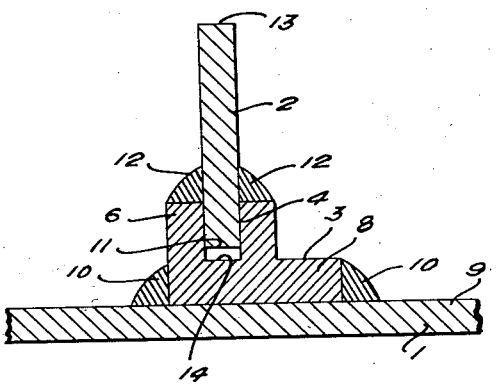
INVENTOR:
Herbert H. Moss,
BY Byrnes Townsend & Potter,
ATTORNEYS.

Patented Apr. 21, 1936

2,038,439

UNITED STATES PATENT OFFICE 2,038,439

WELDED JOINT AND METHOD OF MAKING SAME

Herbert H. Moss, Brooklyn, N. Y., assignor to The Linde Air Products Company, a corporation of Ohio Application April 6, 1932, Serial No. 603,668

10 Claims. (Cl. 29—148)

My invention relates to welded joints for connecting metallic members in which the plane of the face of one member intersects the face of the other member. My invention also relates to the method of making the joint.

Heretofore such joints have been formed by welding one member directly to the other. For example, the edge of a metallic sheet has been welded to the face of another sheet by placing the edge of one sheet upon the face of another sheet in the desired position and then making a fillet weld along the edge of the sheet in each of the angles formed between the faces of the sheets. In such a case, the two lines of welding are concentrated in a narrow zone and are almost equivalent to one heavy line of welding. The more concentrated or the heavier the welds are in a joint, the greater is the tendency of the sheets to warp as a result of the formation of the welded joint. This is especially true when either of the members is under a strain at the point of the joint when the weld is made.

In most cases it is necessary to cut the sheets for such a joint with precision, as the tolerance in the gap between the edge of one sheet and the face of the other sheet to be welded to it must be small in order to obtain a strong weld with the least amount of weld metal. The edge of the intersecting sheet must also be beveled to obtain the best weld penetration.

In a joint made as described above, difficulty is experienced in maintaining the sheets in the desired relation with respect to each other while the joint is being fabricated. It is necessary to provide some means for holding the sheets in the desired position and to resist the warping action of the welding heat.

One of the objects of my invention is to decrease the liability of structural members being distorted or warped as a result of the fabrication of a welded joint between the members in which the plane of the face of one member having a sheet-like wall, such as a plate or tubular section, intersects the face of the other member.

Another object of my invention is to provide greater tolerances in the dimensions of at least one of the structural members entering into a welded joint, and to facilitate the alignment of the parts to be welded.

Another object of my invention is to eliminate the necessity of beveling the edge of one of the members of the joint without any loss in the efficiency of the joint.

Another object of my invention is to provide a novel method for producing an improved welded joint.

The above and other objects of my invention will be more clearly understood from the following description and accompanying drawing in which:

Fig. I is a cross-sectional view of one form of my joint.

Fig. II is a side elevational view of the joint shown in Fig. I; and

Fig. III is a cross-sectional view of another form of my joint.

The two forms of the joint disclosed in the drawing are somewhat similar but each is suitable for use in different situations, as disclosed in my copending application Serial No. 462,081, filed June 18, 1930 of which application the present application is a continuation in part. Both forms of the joint disclosed comprise a plate or sheet 1 which is connected with a like member 2 positioned at right angles thereto. The sheets 1, 2 are connected by means of an intermediate metal strip 3 welded to each of the sheets 1, 2. The metal strip 3 in Figs. I and II has a T shaped cross-section with a groove 4 formed in the stem 5 of the T, and in Fig. III the strip 3 has an L shaped cross-section with a groove 4 formed in one of the legs 6 of the L.

In practising one method of constructing the joint, the head 7 of the T or the grooveless leg 8 of the L of the metal strip 3, as the case may be, is placed against the side or face 9 of one of the sheets in the desired position and is welded to the face of the sheet in the usual manner by means of two lines of fillet welds 10, one placed on each side of the strip 3. The strips 3 are light as compared to some sheets and they do not exert as heavy a load upon the other member being welded as a sheet may do. Also, it is nearly always practicable to weld the strips 3 to faces 9 of structural members before these members enter the structural assembly and thereby avoid the formation of the weld while the member is under a strain, because the strips may be welded to the face of the other member while it is well supported at the point of the weld and otherwise relieved from strains. The parts may be supported and the welding facilitated by means of jigs or the like.

It will also be noted that the two lines of weld metal 10 are separated from each other by a substantial distance and the detrimental warping influences of a concentrated weld are eliminated.

When the member having the strips 3 welded thereto is ready to be placed in a structural assembly with the other members, the two sheets 1, 2 are brought together as shown so that the edge of the vertical sheet 2 fits into the longitudinal groove 4 of the stirp 3. The bottom edge 11 of the sheet 2 fits into the groove 4 a sufficient distance to get some support from the sides of the groove. A fillet weld 12 is then made along the top of the groove 4 on each side of the vertical sheet 2. The groove 4 assists in positioning the parts to be welded and in maintaining the parts in position while the welding is being done. The welding heat tends to warp the edge 11 of the sheet 2 laterally. This action is resisted by the walls of the groove 4. The heat also expands the sheet 2 vertically where heated. This action, if resisted, may cause the sheet 2 to buckle. The edge of the vertical sheet 2 is not heated uniformly, and it tends to curl away from the face of the horizontal sheet 1. These movements of the sheet are allowed to take place freely by the groove 4 without placing strains upon the structural assembly in which the face 9 of the horizontal sheet 1 or the top edge 13 of the vertical sheet 2 may be fixed at the time the vertical sheet 2 is welded to the metal strip 3.

It will be noted that the fillet welds 12 between the vertical sheet 2 and the strips 3 are located a substantial distance from the face 9 of the horizontal sheet 1, and even if the horizontal member 1 were under a load at the time of making these welds 12 the heat would be sufficiently dissipated, that no injurious strains would be set up in that member.

Another advantage derived from the groove 4 is that it is not necessary to cut the vertical dimensions of the vertical sheet 2 with great accuracy as a space may be left between the bottom edge 11 of the sheet 2 and the bottom 14 of the groove 4 without injuriously affecting the strength of the joint.

While I have described specific embodiments of my invention, it is to be understood that changes may be made in the joint as shown without departing from the scope of my invention as defined in the appended claims. For example, it is within the scope of my invention to vary the angle between the faces of the connected members, to use other shapes of grooved strips, and to use any suitable mode of welding. Also, the ends of tubular members may be joined to the face of another member in a manner similar to that in which the sheets shown herein are joined.

I claim:

1. A welded joint comprising a metal strip having a base portion and a top portion, said top portion having a longitudinal groove therein, a second member of said joint having a side surface contacting with the base portion of said strip, a weld extending along the edge of the base portion of said strip and uniting said strip to said surface, a third member of said joint having a wall, an edge of said wall extending into said groove, and a weld extending along the line of contact between the outer edge of said groove and the side of said wall.

2. A welded joint comprising a metal strip having a base portion and a top portion, said top portion having a longitudinal groove therein, a second member of said joint having a side surface contacting with the base portion of said strip, a fillet weld extending along each of the longitudinal edges of the base portion of said strip in contact with said second member, said welds uniting said base portion to said side surface, and a third member of said joint having a wall, and edge of said wall extending into said groove, and a fillet weld extending along each of the lines of contact between the outer edge of said groove and the side of said wall.

3. A welded joint comprising a sheet of metal; an intermediate element having one face thereof welded to the face of said sheet and another face thereof provided with a groove disposed at an angle to said sheet of metal; and a member extending into said groove and welded to said intermediate element.

4. A welded joint comprising a metal strip having a longitudinal groove therein, said strip being welded to the side surface of one joint member along the edges of said strip, a plate forming another joint member having an edge extending into said groove and welded to said strip along the edge of said groove at a distance from the edge of said plate according to variations in the separation of said joint members.

5. A welded joint comprising a T shaped metal strip having a longitudinal groove along the stem of said T, a second member of said joint having a side surface welded to the edge of the head of said T strip, and a third member of said joint comprising a plate having an edge inserted into said groove and welded to the stem of said T along the edges of said groove.

6. A welded joint comprising a sheet of metal, a longitudinal strip of metal having a groove formed longitudinally therein on one side of said strip and the other side of said strip contacting with said sheet of metal, beads of weld metal extending longitudinally along the longitudinal edges of said strip and joining said edges to said sheet, a second sheet of metal arranged at an angle to said first sheet and having an edge extending into said groove, and beads of weld metal extending along said groove and joining said second sheet of metal to said strip.

7. A welded joint comprising a sheet of metal, a longitudinal T shaped metal strip having a longitudinal groove extending along the stem of said T, and having its head contacting with said sheet of metal, longitudinal beads of weld metal extending along the edges of the head of said T strip and joining said edges to said sheet, a second sheet of metal having an edge extending into said groove, and beads of weld metal extending along the top edge of the stem of said T and joining said stem to said second sheet.

8. A welded joint comprising a sheet of metal; an intermediate strip secured to the face of said sheet with weld metal deposited about the longitudinal edges of said strip, said strip being provided with a groove in angular relation with respect to said face; and a second sheet secured edgewise in said groove with weld metal extending between said second sheet and the portion of said strip adjoining said groove.

9. The method of making a fusion welded joint comprising welding a metal strip to a side surface of a second member, and then welding the side of a third member of said joint to the top of said strip a suitable distance from said second member so that the heat of the second weld will be sufficiently dissipated by the strip that it will not injuriously affect the second member, and so that a comparatively large tolerance in the relative location of said second and third members may be permitted.

10. The method of making a fusion welded joint comprising placing a grooved metallic element against the face of a sheet metal plate with the grooved portion away from said plate; rigidly securing said element to said plate by applying weld metal between said plate and the edges of said element; positioning a metal member within said groove and welding said member to said element.

HERBERT H. MOSS.